May 15, 1962 E. ASSEO 3,035,188
TRANSISTOR TYPE IMPULSE RELAY
Filed April 27, 1960
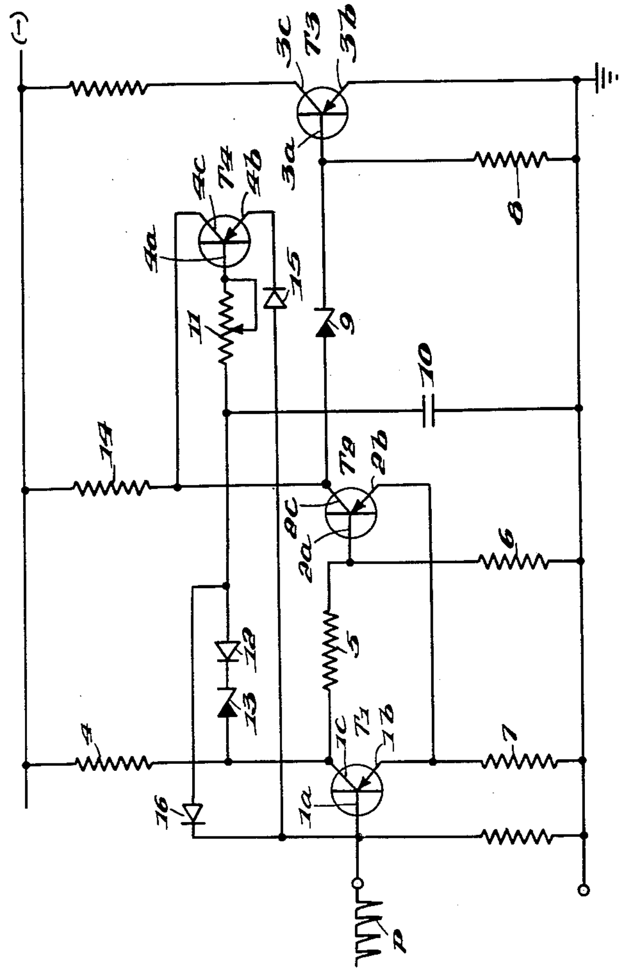
INVENTOR
Edgar Asseo
BY Pierce, Scheffler & Parker
ATTORNEYS 3,035,188
Patented May 15, 1962

3,035,188

TRANSISTOR TYPE IMPULSE RELAY

Edgar Asseo, Geneva, Switzerland, assignor to Aktiengesellschaft Brown, Boveri & Cie, Baden, Switzerland, a joint-stock company Filed Apr. 27, 1960, Ser. No. 24,969
4 Claims. (Cl. 307—88.5)

This invention relates to electrical relaying and in particular to relays of the impulse type which produce, with a uniform sequence of impulses at the input, a direct voltage at the output which can be used to execute a triggering function or other activity. Such relays can be used for distance protection on transmission lines or for other types of protection in which, with the aid of electronic circuits involving use of either electron tubes or transistors, the measured, i.e. input, values are changed into the necessary impulses when a triggering action is to take place.

Multivibrator or "flip-flop" switches have become familiar from high frequency technology. These switches respond to impulses or other types of voltages and produce an output signal which can be an impulse or a continuous current. These switches are often referred to as triggering circuits and may be of the bi-stable or mono-stable type. With the trigger circuit, an input of a definite voltage gives rise to a voltage at the output as long as the input voltage exceeds a predetermined value. With lower voltage values at the input, the output voltage immediately disappears again. One supplies an impulse in such manner as to likewise form an impulse at the output. With bi-stable trigger circuits, when a predetermined voltage value is exceeded, an input signal is produced which remains continuously in effect. Only by special additional measures can the output signal be cut off again. With an input of impulses therefore, a continuous direct current signal arises here. The mono-stable trigger circuit remains in one tipped state for a definite adjustable length of time after the impetus from an external impulse, and then flips back to the initial tipped state, even if the command impulses return. Only at the next impetus impulse can the switch tip again. Such switches have been designed either with electron tubes or with transistors.

For protective circuits, especially distance protection, the problem with an input of short impulses is to produce a direct current output signal as long as the impulses continue. With cessation of the impulses, the signal must disappear again by itself. This problem cannot be solved by any of the known trigger circuits as discussed above.

In accordance with this invention it is proposed, with the use of a transistor-trigger switch in which the output transistor is released by impulses and thereby produces an output signal, and whereupon with the disappearance of the impulses the input transistor immediately cuts off, to provide means which make the transistor switching device bi-stable so long as impulses impinge upon it, and make it mono-stable when the impulses cease. This desired result can be attained with the assistance of an additional transistor, the circuit arrangement of the improved switching device being illustrated in the accompanying drawing which constitutes one practical embodiment of the invention.

With reference now to the drawing, the improved transistor powered switching circuit includes transistors T1 and T2. When there are no impulses to be supplied to the input i.e. when no impulses are supplied to the base *1a* of transistor T1, then transistor T2 will be conductive since an initial negative voltage is supplied to its base *2a* from the resistances 4, 5 and 6 connected in series between ground and a negative potential as voltage dividers.

Base *2a* is connected to a negative potential point between resistances 5 and 6. Transistor T1 is blocked, i.e. it is non-conductive under this condition, because of the voltage drop on resistance 7 connected between ground and the emitter *1b* of transistor T1 which results in a more negative voltage on the emitter *1b* than on the base *1a*. Transistor T3 which is connected in circuit with transistor T2 passes the output signal to a release device, not illustrated. It is blocked off across the positive (mass potential) initial voltage of the resistance 8 which is connected between ground and the base *3a* of transistor T3, since the Zener diode 9 which is connected between the collector *2c* of transistor T2 and base *3a* of the transistor T3 allows no current to get through it because the potential on collector *2c* is less negative than the Zener voltage. Thus no output signal is formed.

Now if voltage impulses P of negative polarity impinge upon the base *1a* of transistor T1, then for the duration of each impulse, transistor T1 becomes conductive. Hereby is provided a less negative voltage upon collector *1c* of transistor T1 which is connected to the base *2a* of transistor T2 by means of resistance 5. Thereby, transistor T2 becomes blocked off and there arises a higher negative voltage on collector *2c*, and the Zener diode 9 is released. Consequently, a negative voltage reaches transistor T3 so that it becomes conductive and an output signal can be given off. If the impulse ceases, then immediately transistor T3 would normally shut off again. In this way, therefore, impulses would arise on transistor T3 (i.e. normal trigger behavior). Now, however, according to the invention, during the entire time when impulses impinge upon base *1a*, there is to arise a continuous direct current on transistor T3, i.e. the latter is to remain conductive even between input impulses. This is now achieved by means of an additional transistor T4 which is connected with a condenser 10, variable resistance 11, diode 12 and Zener diode 13. The latter three elements are connected in series between collector *1c* of transistor T1 and the base *4a* of transistor T4. Condenser 10 is connected between ground and that part of the circuit which connects diode 12 to resistance 11. The collector *2c* of transistor T2 is connected to the collector *4c* of transistor T4 and through resistance 14 to the source of negative potential. The emitter *4b* of transistor T4 is connected through a diode 15 to the base *1a* of transistor T1. A diode 16 is also connected between the base *1a* and that part of the circuit interconnecting diode 12 and one end of resistance 11.

If no voltage pulse is applied to the input base *1a*, then transistor T4 is blocked off. Condenser 10 is then negatively charged across resistance 4 through diode 12 and Zener diode 13.

If a negative impulse P arises at input base *1a*, then collector *2c* of transistor T2 becomes strongly negative and transistor T4 becomes conductive. Thereby, a negative voltage is maintained on base *1a* as long as condenser 10 is charged. Therefore, in the time between the impulses P, also the transistor T1 remains conductive, and transistor T2 remains non-conductive. In this way there arises on transistor T3 a continuous output signal. Condenser 10 is again charged in the briefest time across diode 16 by the negative impulses P each time.

If the impulses P cease, condenser 10 can discharge according to a time constant determined by its capacity and the value of variable resistance 11. The potential at the base *4a* of transistor T4 then gradually becomes less negative until this transistor becomes non-conductive. At this moment, transistors T1 and T2 tip back into their initial positions. The trigger circuit is thus mono-stable on the disappearance of the input impulses. Resistance 11 is made variable for the purpose of selecting at will the time constant of the discharge circuit of condenser 10.

This time constant must be so great that between impulses P, no substantial discharge of the condenser occurs. The time of the discharge must also be so great that even with the appearance of only a single pulse P at the input base 1*a*, a distinct output signal can be produced, thus for example for 100 ms.

After the tipping back into the initial position, condenser 10 is considerably discharged at the first moment. But then since the potential on collector 1*c* is strongly negative, the Zener diode 13 conducts and condenser 10 is charged across the relatively small resistance 4 and diodes 12 and 13 with a small time constant, so that the trigger circuit is immediately reset for another operation.

The advantage of this arrangement is that with one flip-flop circuit working in itself as a trigger, a sometimes bi-stable effect is achieved, so that no additional switching elements are necessary to bring the switching apparatus back to its initial position. The entire arrangement therefor is again ready for operation immediately after cessation of the impulses; with the additional switching elements there would have to be provided an additional time lag which depends upon the longest duration of the disturbance.

I claim:

1. In an impulse type relay, the combination comprising a transistorized trigger circuit including first and second interconnected transistors, said first transistor having an input in the form of negative impulses applied thereto to convert it from a normally non-conductive state to a conductive state and to simultaneously convert said second transistor from a conductive to a non-conductive state, a third transistor having its base connected to the collector of said second transistor through a Zener diode, said third transistor being non-conductive when said second transistor is conductive and being conductive to supply an output signal when said second transistor is non-conductive, and means maintaining said first transistor conductive in the intervals between successive input impulses comprising a fourth transistor having its base connected to a resistance and a condenser arranged in series, a connection from a circuit point intermediate said condenser and resistance through a diode and Zener diode to the collector of said first transistor, and a connection from said circuit point to the base of said first transistor through a second diode for charging said condenser, said fourth transistor being rendered conductive by said input impulses thereby to also maintain said first transistor conductive by means of the charge on said condenser which maintains a negative potential at the base of said first transistor so long as said input impulses continue, said condenser being discharged through said resistance when said input impulses cease such that the potential at the base of said fourth transistor then becomes progressively less negative and said fourth transistor becomes non-conductive, said first and second transistors then also becoming non-conductive and conductive respectively, whereupon said third transistor also becomes non-conductive to cut off said output signal.

2. An impulse type relay as defined in claim 1 wherein the time constant for discharging said condenser is longer than that for the charging thereof.

3. An impulse type relay as defined in claim 1 wherein the time constant for discharging said condenser is greater than the interval between the input impulses.

4. Impulse type relay as defined in claim 1 wherein the time constant for discharging said condenser is at least 100 ms., in order to be able to switch an actuating member satisfactorily.

References Cited in the file of this patent

UNITED STATES PATENTS

| | | |
|---|---|---|
| 2,519,278 | Oliver | Aug. 15, 1950 |
| 2,770,732 | Chong | Nov. 13, 1956 |
| 2,964,655 | Mann | Dec. 13, 1960 |
| 2,965,768 | Wanlass | Dec. 20, 1960 |